3,092,485
PROCESS OF DEFOLIATING CHLOROPHYLLACEOUS PLANTS

William E. Duggins, Los Angeles, Calif., assignor to General Aniline & Film Corporation, New York, N.Y., a corporation of Delaware
No Drawing. Filed June 29, 1961, Ser. No. 120,475
5 Claims. (Cl. 71—2.7)

The present invention relates to defoliation of growing chlorophyllaceous plants, and particularly to an improved chemical defoliation of such plants which accelerates leaf fall.

A defoliant is a substance which when applied to a growing chlorophyllaceous plant, which normally undergoes defoliation during its life cycle at maturity, causes an accelerated dropping of the leaves without destroying the plant. For economic reasons, a defoliant must be effective in relatively low concentrations.

Defoliation is applied to various chlorophyllaceous plants such as castor beans, soy beans, nursery stock, fruit trees and particularly to cotton plants. In the mechanical harvesting of the latter, the presence of excessive foliage is undesirable, since the mechanical devices used will harvest the crop together with whatever foliage is in its proximity. By removing the foliage at the time of harvesting, it is probable that late season blight and undesired developments may be avoided.

It has been established that defoliation results in higher grades of cotton, because under good conditions few leaves remain to clog spindles, air trash or stain the fibre. Chemical defoliation has a tendency to straighten up the plant and as a consequence increase their exposure to sun and air. This enables the cotton plant to dry more quickly and thoroughly and opens the mature bolls much faster. Chemical defoliation is also advantageous in that it reduces population of damaging insects particularly aphids and whiteflies, both of which cause honey-dew deposit in the open bolls.

The application of a chemical defoliant to cotton plants depends upon many factors. For example, if a cotton boll is easily cut through even though it is not mature, that is, if the fibre "strings" and the youngest bolls cannot be dented by pressure between thumb and two fingers, it is satisfactory to apply the defoliants.

Many materials have been suggested as defoliants. Among these are included such products as pentachlorophenol, sodium chlorate, magnesium chlorate, magnesium chlorate hexahydrate, calcium cyanamide, sodium 3,6-endoxohexahydrophthalate, etc. The latter compound has not been widely accepted, because depending upon temperature and humidity, it has the tendency to desiccate the leaves thus freezing them to the plant. Desiccation or drying out is not defoliation and results in trashy seed cotton requiring extra cleaning and ginning which often reduces staple length. Calcium cyanamide is not operative without dew. The chlorates are all very dangerous unless mixed with fire suppressors. In other words all of the chlorates presently employed are potential fire and explosion hazards. While it is admitted that the chlorate defoliants as commercially formulated are relatively safe, no untrained person can or should attempt such formulation. Numerous fires have resulted from the chance mixing of chlorate defoliants and organic insecticides.

I have found that the foregoing disadvantages are readily overcome by the employment of an ammonium or alkali metal salt of 2-butene-1,4-diol-3-sulfonate as chemical defoliants which are not fire or explosion hazards, and which may be formulated with ease by untrained workers.

I have further found that such ammonium and alkali metal salts of 2-butene-1,4-diol-3-sulfonate are not only effective in the defoliation of many chlorophyllaceous plants such as castor beans, soy beans, fruit trees, etc. but are particularly effective as cotton plant defoliants when employed in a concentration ranging from 0.5 to 1.5% by weight in a liquid medium.

The ammonium and alkali metal salts of 2-butene-1,4-diol-3-sulfonate, which are employed as defoliants in accordance with the present invention, are characterized by the following formula:

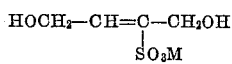

wherein M represents an ammonium group or an alkali metal such as sodium, lithium or potassium.

The foregoing salts are prepared in accordance with the procedure disclosed in copending application of Otto F. Hecht, Serial No. 130,445, filed on even date and entitled "Process of Preparing Salts of Monosulfonic Acids of Monohydric and Dihydric Olefinic Alcohols."

The foregoing ammonium and alkali metal salts may be employed as dusts while utilizing clays such as bentonite, fuller's earth, talc, etc. as the inert diluent. They may be also employed in aqueous solution since the salts are readily soluble in water in fairly high concentrations. When water is to be employed as the liquid carrier, it may be desirable to add to the aqueous solution a sufficient quantity of any commercially available surface active agent which will function as a sticker and will permit adhesion to the foliage when applied as an aqueous spray. Instead of straight aqueous solutions, the salts may be dissolved in a small quantity of a water miscible organic solvent such as acetone, methyl ethyl ketone or dioxane and the like, to which may be added a surface active agent and the resulting solution diluted with water to proper volume. As for the surface active agent to be employed, any of the well known preparations may be employed with satisfactory results, such as for example the alkali metal salts of long chain alkyl sulfates, alkali metal salts of alkyl aryl sulfonic acids, polyethylene glycol ethers of alkyl phenols, etc. Products of this type are legion and no difficulty will be encountered in the selection of the most suitable surface active agent which will depend of course upon price, availability, etc.

The ammonium and alkali metal salts of 2-butene-1,4-diol-3-sulfonate may also be applied in non-aqueous media, such as light, i.e. purified, petroleum hydrocarbons particularly light mineral seal oil, decolorized kerosene, refined gas oil and very light lubricating oils and the like, which are normally employed in agricultural sprays in emulsion form. In the latter case, a defoliating amount of the trichloro alkanol is first dissolved in the smallest quantity possible of either acetone, methyl ethyl ketone or dioxane and the solution diluted with a desired quantity of a light petroleum hydrocarbon containing a sufficient amount of any well known surface active agent as emulsifier.

The amount of the ammonium or alkali metal salt to be employed will depend of course on the degree of defoliation desired, the maturity of the plant, the liquid carrier employed and the weather conditions at the time of application. In general, the defoliating amount may range from 0.5 to 3% by weight of the salt based on the weight of the liquid carrier. For practical purposes, I found that an amount ranging from 0.5 to 1.5% by weight of the salt is sufficient to yield a sprayable composition which will insure complete coverage of the foliage and substantially defoliate the leaves.

For test purposes, I prepared solutions of the salts in an aqueous carrier by dissolving 1 gram of the salt in 5 ml. of acetone, adding 5 ml. of a 1% solution of a surface active agent obtained by the condensation of 1 mole of dinonyl phenol with 15 mls. of ethylene oxide followed by the addition of sufficient water to make 100 ml. of solution.

In order to demonstrate the defoliating activity of the various salts of the 2-butene-1,4-diol-3-sulfonate, the following test procedure was employed.

The test plants consist of cotton (Coker 100 variety) and must have 10 to 12 leaves. The formulation of the defoliant solution is prepared as noted above, and the following test conducted:

*Setting up the test.*—Two cotton seeds are planted in a 4" clay pot. Seeds are covered and watered. They are grown in greenhouse with minimum night temperature of 70° F. until they reach proper test age, which takes approximately 2½ to 3 months. Beginning September 1, supplemental light by means of overhead incandescents must be provided in the amount of 4 hrs. per night. Two 4" pots are needed for each chemical at each level plus 2 untreated controls and 4 for standards.

*Method of treatment.*—When the plants have 10 to 12 leaves, they are sprayed with the test solutions until run-off occurs. Plants are removed to a place where they may dry and then placed in greenhouse on bench.

*Environmental control.*—Greenhouse. Care must be exercised to avoid contact between plants of different levels of treatment or different chemical treatment. Care must be exercised to avoid wetting foliage during the first 3 days following treatment.

*Duration of test.*—Readings are taken on the mature leaves remaining after 14 days and 30 days. Any unusual effects which are noted should be recorded.

*Type of data.*—Counts are made of the mature leaves remaining and notes are made of unusual effects. Each treatment is to be compared with the untreated control when readings are taken.

*Damage.*—The damage to the plant is rated on a scale of 1 to 5, 1 being little or no damage and 5 being severe.

Cotton plants used as controls were sprayed with a controlled solution consisting merely of 5 parts by volume of acetone, 5 parts by volume of a 1% of a surface active agent and 90 parts by volume of water.

The 1% solution of each of the ammonium and alkali metal salts prepared as above was also diluted with an equal volume of water to yield concentrations of 0.1 and 0.5% of salt in the solution.

After the tests were completed with spraying the cotton plants with 0.1, 0.5 and 1% concentration of the salts, the following data were obtained:

*Table*

| Salt of 2-butene-1,4-diol-3-sulfonate | Percent Concentration | Percent Defoliation | Percent Damage |
|---|---|---|---|
| Ammonium | 1.0 | 90 | 1 |
| Lithium | 1.0 | 92 | 1 |
| Potassium | 1.0 | 95 | 1 |
| Sodium | 1.0 | 95 | 1 |
| Do | 1.0 | 90 | 1 |
| Do | 0.5 | 45 | 1 |
| Do | 0.1 | 10 | 1 |

From the foregoing results, it is fairly evident that the ammonium and alkali metal salts of 2-butene-1,4-diol-3-sulfonate are very effective defoliants.

I claim:
1. The process of defoliating plants which consists of applying to the leaves of said plants at a rate sufficient to cause defoliation a compound having the following formula:

$$HOCH_2-CH=C-CH_2OH$$
$$|$$
$$SO_3M$$

wherein M represents a member selected from the class consisting of ammonium and alkali metal.

2. The process according to claim 1 wherein the compound is ammonium 2-butene-1,4-diol-3-sulfonate.

3. The process according to claim 1 wherein the compound is sodium 2-butene-1,4-diol-3-sulfonate.

4. The process according to claim 1 wherein the compound is potassium 2-butene-1,4-diol-3-sulfonate.

5. The process according to claim 1 wherein the compound is lithium 2-butene-1,4-diol-3-sulfonate.

References Cited in the file of this patent
UNITED STATES PATENTS

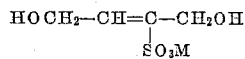

| 2,840,598 | Schwartz | June 24, 1958 |
| 2,997,379 | Goodhue | Aug. 22, 1961 |